(12) United States Patent
Annampedu

(10) Patent No.: US 8,411,385 B2
(45) Date of Patent: Apr. 2, 2013

(54) SYSTEMS AND METHODS FOR IMPROVED TIMING RECOVERY

(75) Inventor: Viswanath Annampedu, Schnecksville, PA (US)

(73) Assignee: LSI Corporation, San Jose, CA (US)

( * ) Notice: Subject to any disclaimer, the term of this patent is extended or adjusted under 35 U.S.C. 154(b) by 191 days.

(21) Appl. No.: 12/972,904

(22) Filed: Dec. 20, 2010

(65) Prior Publication Data

US 2012/0155587 A1 Jun. 21, 2012

(51) Int. Cl.
*G11B 5/09* (2006.01)

(52) U.S. Cl. .......................................................... 360/51

(58) Field of Classification Search .................... 360/51, 360/32, 39, 42, 61
See application file for complete search history.

(56) References Cited

U.S. PATENT DOCUMENTS

| | | | |
|---|---|---|---|
| 3,973,182 A | 8/1976 | Kataoka | |
| 3,973,183 A | 8/1976 | Kataoka | |
| 4,024,571 A | 5/1977 | Dischert et al. | |
| 4,777,544 A | 10/1988 | Brown et al. | |
| 5,043,932 A * | 8/1991 | Asghar et al. | 708/290 |
| 5,130,866 A | 7/1992 | Klaassen et al. | |
| 5,237,325 A | 8/1993 | Klein et al. | |
| 5,278,703 A | 1/1994 | Rub et al. | |
| 5,309,357 A | 5/1994 | Stark et al. | |
| 5,341,249 A | 8/1994 | Abbott et al. | |
| 5,377,058 A | 12/1994 | Good et al. | |
| 5,521,948 A | 5/1996 | Takeuchi | |
| 5,523,902 A | 6/1996 | Pederson | |
| 5,594,341 A | 1/1997 | Majidi-Ahy | |
| 5,668,679 A | 9/1997 | Swearingen et al. | |
| 5,696,639 A | 12/1997 | Spurbeck et al. | |
| 5,781,129 A | 7/1998 | Schwartz et al. | |
| 5,787,125 A | 7/1998 | Mittel | |
| 5,798,885 A | 8/1998 | Saiki et al. | |
| 5,835,295 A | 11/1998 | Behrens | |
| 5,844,139 A * | 12/1998 | Miller et al. | 73/602 |
| 5,844,920 A | 12/1998 | Zook et al. | |
| 5,852,524 A | 12/1998 | Glover et al. | |
| 5,892,632 A | 4/1999 | Behrens | |
| 5,955,783 A | 9/1999 | Ben-Efraim | |

(Continued)

FOREIGN PATENT DOCUMENTS

| | | |
|---|---|---|
| FR | 2904168 A1 | 1/2008 |
| WO | WO 03/047091 | 6/2003 |
| WO | WO 2008/009620 | 1/2008 |

OTHER PUBLICATIONS

U.S. Appl. No. 12/663,319, filed Dec. 7, 2009, Ratnakar Aravind.
U.S. Appl. No. 12/838,601, filed Aug. 19, 2010, Wilson, Ross.

(Continued)

*Primary Examiner* — Fred Tzeng

(74) *Attorney, Agent, or Firm* — Hamilton DeSanctis & Cha

(57) ABSTRACT

Various embodiments of the present invention provide systems and methods for timing recovery. As an example, timing recovery circuits include: a first digital interpolation circuit, a second digital interpolation circuit, a phase selection circuit, and a sampling clock rotation circuit. The first digital interpolation circuit is operable to receive a data input and to provide a first interpolated output corresponding to a first phase, and the second digital interpolation circuit is operable to receive the data input and to provide a second interpolated output corresponding to a second phase. The phase selection circuit operable to select the first phase for processing, and the sampling clock rotation circuit is operable to move a sampling clock away from the first phase.

20 Claims, 6 Drawing Sheets

U.S. PATENT DOCUMENTS

| | | | |
|---|---|---|---|
| 5,970,104 A | 10/1999 | Zhong et al. | |
| 5,986,830 A | 11/1999 | Hein | |
| 5,987,562 A | 11/1999 | Glover | |
| 6,009,549 A | 12/1999 | Bliss et al. | |
| 6,023,383 A | 2/2000 | Glover et al. | |
| 6,069,583 A | 5/2000 | Silvestrin et al. | |
| 6,081,397 A | 6/2000 | Belser | |
| 6,111,712 A | 8/2000 | Vishakhadatta et al. | |
| 6,208,478 B1 | 3/2001 | Chiu et al. | |
| 6,269,058 B1 | 7/2001 | Yamanoi et al. | |
| 6,278,591 B1 | 8/2001 | Chang | |
| 6,400,518 B1 | 6/2002 | Bhaumik et al. | |
| 6,404,829 B1 | 6/2002 | Sonu | |
| 6,411,452 B1 | 6/2002 | Cloke | |
| 6,441,661 B1 | 8/2002 | Aoki et al. | |
| 6,490,110 B2 | 12/2002 | Reed et al. | |
| 6,493,162 B1 | 12/2002 | Fredrickson | |
| 6,519,102 B1 | 2/2003 | Smith | |
| 6,530,060 B1 | 3/2003 | Vis et al. | |
| 6,603,622 B1 | 8/2003 | Christiansen et al. | |
| 6,606,048 B1 | 8/2003 | Sutardja | |
| 6,633,447 B2 | 10/2003 | Franck et al. | |
| 6,646,822 B1 | 11/2003 | Tuttle et al. | |
| 6,657,802 B1 | 12/2003 | Ashley et al. | |
| 6,775,529 B1 | 8/2004 | Roo | |
| 6,788,484 B2 | 9/2004 | Honma | |
| 6,813,108 B2 | 11/2004 | Annampedu et al. | |
| 6,816,328 B2 | 11/2004 | Rae | |
| 6,839,014 B2 | 1/2005 | Uda | |
| 6,856,183 B2 | 2/2005 | Annampedu | |
| 6,876,511 B2 | 4/2005 | Koyanagi | |
| 6,897,687 B2 * | 5/2005 | Cafaro et al. | 327/105 |
| 6,912,099 B2 | 6/2005 | Annampedu et al. | |
| 6,963,521 B2 | 11/2005 | Hayashi | |
| 6,999,257 B2 | 2/2006 | Takeo | |
| 6,999,264 B2 | 2/2006 | Ehrlich | |
| 7,002,761 B1 | 2/2006 | Sutardja et al. | |
| 7,002,767 B2 | 2/2006 | Annampedu et al. | |
| 7,038,875 B2 | 5/2006 | Lou et al. | |
| 7,054,088 B2 | 5/2006 | Yamazaki et al. | |
| 7,072,137 B2 | 7/2006 | Chiba | |
| 7,082,005 B2 | 7/2006 | Annampedu et al. | |
| 7,092,462 B2 | 8/2006 | Annampedu et al. | |
| 7,116,504 B1 | 10/2006 | Oberg | |
| 7,126,776 B1 | 10/2006 | Warren, Jr. et al. | |
| 7,136,250 B1 | 11/2006 | Wu et al. | |
| 7,154,689 B1 | 12/2006 | Shepherd et al. | |
| 7,167,328 B2 | 1/2007 | Annampedu et al. | |
| 7,180,693 B2 | 2/2007 | Annampedu et al. | |
| 7,187,739 B2 | 3/2007 | Ma | |
| 7,191,382 B2 | 3/2007 | James et al. | |
| 7,193,544 B1 | 3/2007 | Fitelson et al. | |
| 7,193,798 B2 | 3/2007 | Byrd et al. | |
| 7,199,961 B1 | 4/2007 | Wu et al. | |
| 7,203,013 B1 | 4/2007 | Han et al. | |
| 7,206,146 B2 | 4/2007 | Flynn et al. | |
| 7,230,789 B1 | 6/2007 | Brunnett et al. | |
| 7,248,425 B2 | 7/2007 | Byun et al. | |
| 7,253,984 B1 | 8/2007 | Patapoutian et al. | |
| 7,265,937 B1 | 9/2007 | Erden et al. | |
| 7,286,313 B2 | 10/2007 | Erden et al. | |
| 7,301,717 B1 | 11/2007 | Lee et al. | |
| 7,308,057 B1 | 12/2007 | Patapoutian | |
| 7,323,916 B1 | 1/2008 | Sidiropoulos et al. | |
| 7,362,536 B1 | 4/2008 | Liu et al. | |
| 7,375,918 B1 | 5/2008 | Shepherd et al. | |
| 7,411,531 B2 | 8/2008 | Aziz et al. | |
| 7,420,498 B2 | 9/2008 | Barrenscheen | |
| 7,423,827 B2 | 9/2008 | Neville et al. | |
| 7,446,690 B2 | 11/2008 | Kao | |
| 7,466,251 B2 * | 12/2008 | Uchino | 341/120 |
| 7,499,238 B2 | 3/2009 | Annampedu | |
| 7,525,460 B1 | 4/2009 | Liu et al. | |
| 7,529,320 B2 | 5/2009 | Byrne et al. | |
| 7,545,232 B2 * | 6/2009 | Boos et al. | 332/145 |
| 7,558,177 B2 | 7/2009 | Ogura et al. | |
| 7,602,568 B1 | 10/2009 | Katchmart | |
| 7,616,395 B2 | 11/2009 | Yamamoto | |
| 7,620,101 B1 | 11/2009 | Jenkins | |
| 7,630,155 B2 | 12/2009 | Maruyama et al. | |
| 2002/0001151 A1 | 1/2002 | Lake | |
| 2002/0150179 A1 | 10/2002 | Leis et al. | |
| 2002/0176185 A1 | 11/2002 | Fayeulle et al. | |
| 2002/0181377 A1 | 12/2002 | Nagata et al. | |
| 2003/0090971 A1 | 5/2003 | Gushima et al. | |
| 2003/0095350 A1 | 5/2003 | Annampedu et al. | |
| 2004/0179460 A1 | 9/2004 | Furumiya et al. | |
| 2005/0046982 A1 | 3/2005 | Liu et al. | |
| 2005/0157415 A1 | 7/2005 | Chiang | |
| 2005/0243455 A1 | 11/2005 | Annampedu | |
| 2007/0064847 A1 | 3/2007 | Gaedke | |
| 2007/0071152 A1 | 3/2007 | Chen et al. | |
| 2007/0103805 A1 | 5/2007 | Hayashi | |
| 2007/0104300 A1 | 5/2007 | Esumi et al. | |
| 2007/0183073 A1 | 8/2007 | Sutardja et al. | |
| 2007/0230015 A1 | 10/2007 | Yamashita | |
| 2007/0263311 A1 | 11/2007 | Smith | |
| 2007/0280059 A1 | 12/2007 | Cheng et al. | |
| 2008/0056403 A1 | 3/2008 | Wilson | |
| 2008/0080082 A1 | 4/2008 | Erden et al. | |
| 2008/0212715 A1 | 9/2008 | Chang | |
| 2008/0266693 A1 | 10/2008 | Bliss et al. | |
| 2009/0002862 A1 | 1/2009 | Park et al. | |
| 2009/0142620 A1 | 6/2009 | Yamamoto et al. | |
| 2009/0245448 A1 | 10/2009 | Ran et al. | |
| 2009/0274247 A1 | 11/2009 | Galbraith et al. | |

OTHER PUBLICATIONS

U.S. Appl. No. 12/851,475, filed Aug. 5, 2010, Annampedu, Viswanath.
U.S. Appl. No. 12/887,327, filed Sep. 21, 2010, Llu et al.
U.S. Appl. No. 12/894,221, filed Sep. 30, 2010, Yang et al.
U.S. Appl. No. 12/946,048, filed Nov. 15, 2010, Yang et al.
U.S. Appl. No. 12/947,962, filed Nov. 17, 2010, Liu et al.
U.S. Appl. No. 12/946,033, filed Nov. 15, 2010, Yang et al.
U.S. Appl. No. 12/955,789, filed Nov. 29, 2010, Annampedu et al.
U.S. Appl. No. 12/955,821, filed Nov. 29, 2010, Annampedu et al.
U.S. Appl. No. 12/972,904, filed Dec. 20, 2010, Viswanath Annampedu.
U.S. Appl. No. 13/100,021, filed May 3, 2011, Xia, Haitao et al.
U.S. Appl. No. 13/113,210, filed May 23, 2011, Zhang, Xun et al.
U.S. Appl. No. 13/014,754, filed Jan. 27, 2011, Viswanath Annampedu.
U.S. Appl. No. 13/009,067, filed Jan. 19, 2011, Zhang, Xun et al.
U.S. Appl. No. 13/050,048, filed Mar. 17, 2011, Xia, Haitao et al.
U.S. Appl. No. 13/096,873, filed Apr. 28, 2011, Wilson, Ross S.
U.S. Appl. No. 13/173,088, filed Jun. 30, 2011, Grundvig, et al.
U.S. Appl. No. 13/186,267, filed Jul. 19, 2011, Xia, Haitao et al.
U.S. Appl. No. 13/242,983, filed Sep. 23, 2011, Grundvig, Jeffery P.
Annampedu, V. et al, "Adaptive Algorithms for Asynchronous Detection of Coded Servo Signals Based on Interpolation", IEEE Transactions on Magnetics, vol. 41, No. 10, Oct. 2005.
Aziz and Annampedu, "Asynchronous Maximum Likelihood (ML) Detection of Servo repeatable Run Out (RRO) Data" Magnetics Conf. IEEE International May 2006.
Aziz et al "Interpolation Based Maximum-Likelihood(ML) Detection of Asynchronous Servo Repeatable Run Out (RRO) Data", Digest, IEEE Intl Magnetics Conf. vol. 42, No. 10 Oct. 2006.
Kryder, M. et al "Heat Assisted Magnetic Recording" Proc. IEEE, vol. 96, No. 11, p. 1810, Nov. 2008.
Weller et al "Thermal Limits in Ultrahigh-density Magnetic Recording" IEEE Trans. Magn. vol. 35, No. 6, p. 4423, Nov. 1999.

* cited by examiner

SYSTEMS AND METHODS FOR IMPROVED TIMING RECOVERY

BACKGROUND OF THE INVENTION

The present invention relates generally to detecting information, and more particularly without limitation to systems and methods for synchronizing to a data stream.

Typical data processing involves receiving a data stream and processing the data stream to recover the originally provided data. In such systems, a data clock may be recovered from the received data stream, and used to process the received data. This clock recovery often relies on a phase lock loop circuit driven by a phase to phase sampling error on a known pattern. Such an approach is capable of synchronizing to a received data stream, but often requires a known pattern of an extended length to support convergence on a desired phase and frequency. This extended length pattern reduces bandwidth of useful data transfer. Thus, for example, in the situation where the data stream is derived from a storage medium, less area of the storage medium may be dedicated to useful data due to the extended length pattern required to synchronize to the data stream. As another example, where the data stream is derived from a wireless transmission device, a reduced portion of the overall transmission bandwidth may be dedicated to useful data due to the extended length pattern required to synchronize to the data stream.

Hence, for at least the aforementioned reasons, there exists a need in the art for advanced systems and methods for detecting information.

BRIEF SUMMARY OF THE INVENTION

The present invention relates generally to detecting information, and more particularly without limitation to systems and methods for synchronizing to a data stream.

Various embodiments of the present invention provide timing recovery circuits that include: a first digital interpolation circuit, a second digital interpolation circuit, a phase selection circuit, and a sampling clock rotation circuit. The first digital interpolation circuit is operable to receive a data input and to provide a first interpolated output corresponding to a first phase, and the second digital interpolation circuit is operable to receive the data input and to provide a second interpolated output corresponding to a second phase. The phase selection circuit operable to select the first phase for processing, and the sampling clock rotation circuit is operable to move a sampling clock away from the first phase. In some instances of the aforementioned embodiments, the phase selection circuit is operable to select between the first phase and the second phase based upon a comparison of the first interpolated value and the second interpolated value. In some cases, the first phase is selected when the first interpolated value is greater than the second interpolated value.

In some cases, the first phase is an undesirable phase and the second phase is a desired phase. In various cases, the circuit further includes an analog to digital converter circuit operable to convert an analog signal to the data input at a phase governed by the sampling clock. In one or more cases where a period of the sampling clock is T, the first phase is a multiple of T/4, and wherein the second phase is T/8, 3T/8, 5T/8, or 7T/8. In particular cases, the sampling clock rotation circuit is a coarse phase mixer circuit. In some cases, moving the sampling clock away from the first phase includes phase shifting the sample clock toward a zero phase offset.

In various instances of the aforementioned embodiments, the timing recovery circuit is implemented as part of an integrated circuit. In one or more instances of the aforementioned embodiments, the timing recovery circuit is implemented as part of a storage device. In such cases, the storage device may be, but is not limited to, a hard disk drive. In other cases, the timing recovery circuit is implemented as part of a data transmission device.

Other embodiments of the present invention provide methods for timing recovery that include: receiving an analog signal; converting the analog signal to a series of digital samples at a phase corresponding to a sample clock; interpolating a sample from the series of digital samples to yield a first interpolated value corresponding to a first phase and a second interpolated value corresponding to a second phase; selecting one of the first phase and the second phase based upon the first interpolated value and the second interpolated value to yield a selected phase; and modifying the sample clock based upon the selected phase.

In some instances of the aforementioned embodiment, the selected phase is the first phase that is an undesirable phase. In such instances, modifying the sample clock based upon the selected phase includes phase shifting the sample clock away from the first phase. In particular cases, phase shifting the sample clock away from the first phase includes phase shifting the sample clock toward a zero phase offset. In one or more instances of the aforementioned embodiments, the selected phase is the second phase that is a desired phase. In such instances, modifying the sample clock based upon the selected phase includes providing a non-phase shifted clock as the sample clock. In particular instances of the aforementioned embodiments, the period of the sample clock is T, the first phase is a multiple of T/4, and the second phase is T/8, 3T/8, 5T/8, or 7T/8.

Yet other embodiments of the present invention provide storage devices that include a storage medium operable to store information, a read/write head assembly disposed in relation to the storage medium, and a read channel circuit. The read/write head assembly is operable to sense the information and to provide an analog signal corresponding to the information. The read channel circuit includes a first digital interpolation circuit, a second digital interpolation circuit, a phase selection circuit, and a sampling clock rotation circuit. The first digital interpolation circuit is operable to receive a data input and to provide a first interpolated output corresponding to a first phase, and the second digital interpolation circuit is operable to receive the data input and to provide a second interpolated output corresponding to a second phase. The phase selection circuit operable to select the first phase for processing, and the sampling clock rotation circuit is operable to move a sampling clock away from the first phase.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention relates generally to detecting information, and more particularly without limitation to systems and methods for synchronizing to a data stream.

Figure 1A:
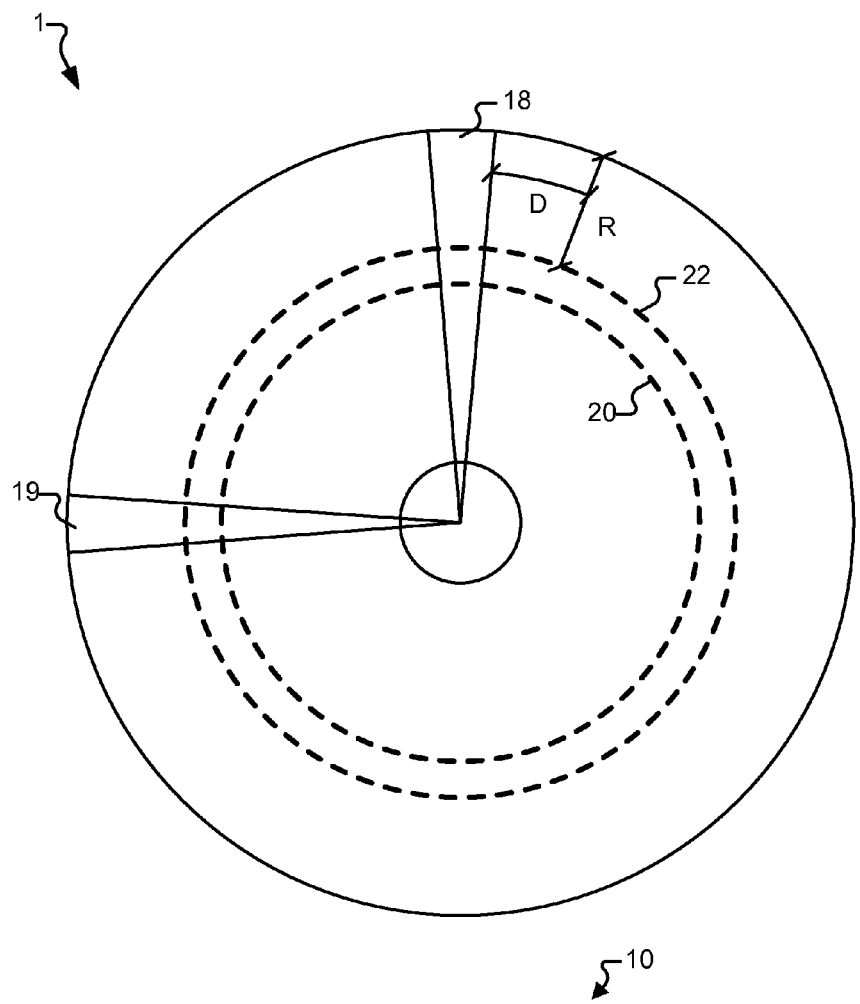
FIG. 1a is a block diagram of a known magnetic storage medium and sector data scheme.
Figure 1A:
Figure 1A:
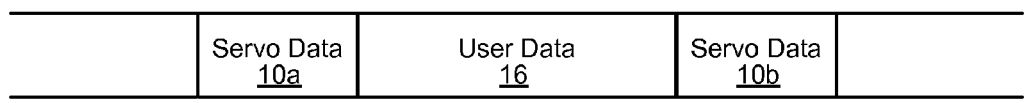

Turning to FIG. 1a, a storage medium 1 is shown with two exemplary tracks 20, 22 indicated as dashed lines. The tracks are segregated by servo data written within wedges 19, 18. These wedges include servo data 10 that are used for control and synchronization of a read/write head assembly over a desired location on storage medium 1. In particular, this servo data generally includes a preamble pattern 11 followed by a sector address mark 12 (SAM). Sector address mark 12 is followed by a Gray code 13, and Gray code 13 is followed by burst information 14. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 14. Between the servo data bit patterns 10a and 10b, a user data region 16 is provided.

In operation, storage medium 1 is rotated in relation to a sensor that senses information from the storage medium. In a read operation, the sensor would sense servo data from wedge 19 (i.e., during a servo data period) followed by user data from a user data region between wedge 19 and wedge 18 (i.e., during a user data period) and then servo data from wedge 18. In a write operation, the sensor would sense servo data from wedge 19 then write data to the user data region between wedge 19 and wedge 18. Then, the sensor would be switched to sense a remaining portion of the user data region followed by the servo data from wedge 18.

Figure 1B:
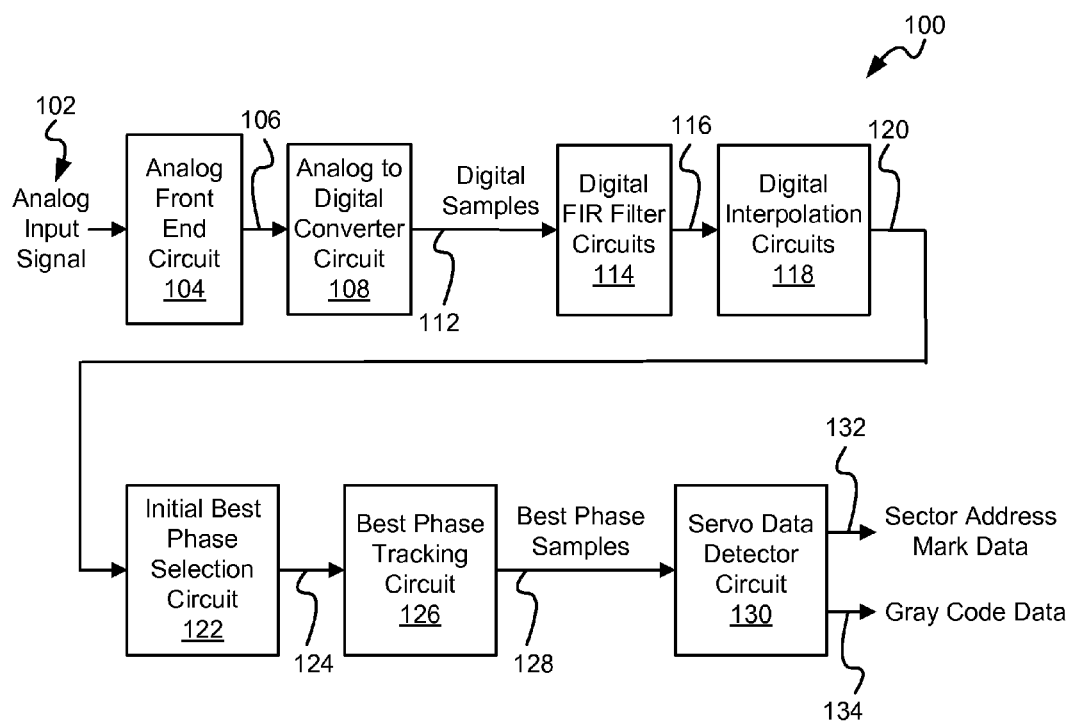
FIG. 1b depicts a known synchronization detector circuit.

Turning to FIG. 1b, a known synchronization detector circuit 100 is depicted. Synchronization detector circuit 100 includes an analog front end circuit 104 that receives an analog input signal 102 and provides a corresponding analog signal 106. Analog signal 106 is provided to an analog to digital converter circuit 108. Analog to digital converter circuit 108 provides a series of digital samples 112 representing analog signal 106. Digital samples 112 are synchronized to a sample clock provided to analog to digital converter circuit 108. Digital samples 112 are provided to a bank of digital finite impulse response (FIR) filter circuits 114 that filters the received input and provides corresponding filtered outputs 116. Filtered outputs 116 are provided to a bank of digital interpolation circuits 118 that yields a number of interpolated outputs 120. An initial best phase selection circuit 122 received interpolated outputs 120 and selects an initial best phase and provides an indication of the selected initial best phase as an initial phase output 124. This initial best phase is selected as the phase that yields the maximum and minimum values as digital samples 112.

A best phase tracking circuit 126 uses the received initial phase output 124 and selects values of interpolated output 120 that corresponds to the initial phase output 124. The selected values are provided as best phase samples 128 to a servo data detector circuit 130. Servo data detector circuit 130 parses the received best samples 128 to provide sector address mark data 132 and Gray code data 134.

It has been discovered that in timing recovery circuits such as synchronization detector circuit 100, performance varies for different initial phase offsets due to quantization and interpolation errors. Performance for some initial phases is acceptable, and for some other phases it is unacceptable. More specifically, performance varies as a sine wave as initial phase is swept from 0 to xT, where T is servo synthesizer period and x represents a number of samples taken per period. When the sampling phase is forty-five degrees offset from the peak of the sampled signal, the samples correspond to the shoulders of the signal. When samples of the shoulders are converted to peak-zero values substantial error may result at the output of the digital interpolation process due to quantization and fixed point interpolation errors. Thus, a forty-five degree sampling offset is less reliable than where the sampling phase exhibits no offset.

Various embodiments of the present invention provide systems, circuits and methods that make timing recovery less sensitive to an initial phase offset by rotating a phase of a sampling clock away from initial phases that produce unacceptable performance and toward an initial phase that produce acceptable performance. Such an approach provides a quick way to estimate the initial phase using best phase select logic and a coarse phase mixer to change the sampling phase used by an analog to digital converter circuit. Such a quick sampling phase transition allows for timing recovery that requires fewer bit periods of timing recovery data (e.g., fewer period of a preamble field) to identify the appropriate phase. In some cases, such an approach reduces sensitivity of timing recovery to an initial random phase without requiring a phase lock loop circuit.

Figure 2:
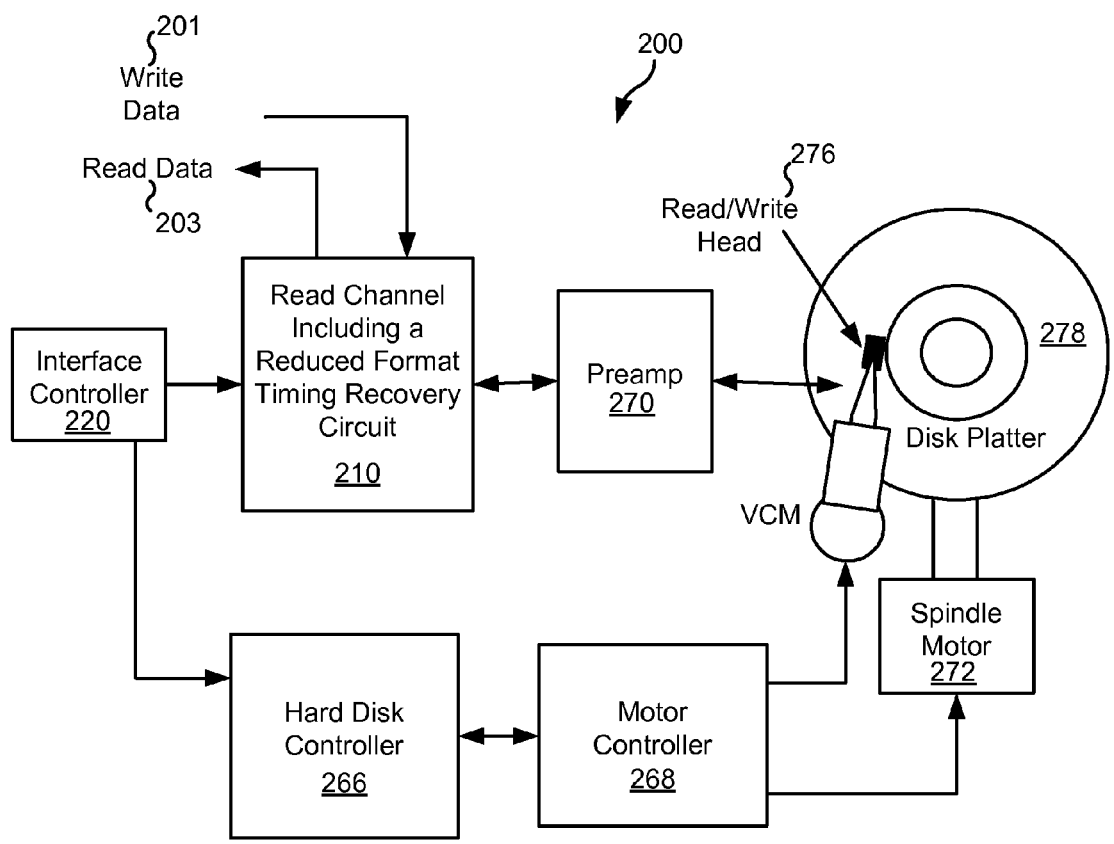
FIG. 2 shows a storage system including a read channel circuit with a reduced format timing recovery circuit in accordance with some embodiments of the present invention.

Turning to FIG. 2, a storage system 200 including a read channel circuit 210 with a reduced format timing recovery circuit is shown in accordance with some embodiments of the present invention. Storage system 200 may be, for example, a hard disk drive. Storage system 200 also includes a preamplifier 270, an interface controller 220, a hard disk controller 266, a motor controller 268, a spindle motor 272, a disk platter 278, and a read/write head 276. Interface controller 220 controls addressing and timing of data to/from disk platter 278. The data on disk platter 278 consists of groups of magnetic signals that may be detected by read/write head assembly 276 when the assembly is properly positioned over disk platter 278. In one embodiment, disk platter 278 includes magnetic signals recorded in accordance with either a longitudinal or a perpendicular recording scheme.

In a typical read operation, read/write head assembly 276 is accurately positioned by motor controller 268 over a desired data track on disk platter 278. Motor controller 268 both positions read/write head assembly 276 in relation to disk platter 278 and drives spindle motor 272 by moving read/write head assembly to the proper data track on disk platter 278 under the direction of hard disk controller 266. Spindle motor 272 spins disk platter 278 at a determined spin rate (RPMs). Once read/write head assembly 278 is positioned adjacent the proper data track, magnetic signals representing data on disk platter 278 are sensed by read/write head assembly 276 as disk platter 278 is rotated by spindle motor 272. The sensed magnetic signals are provided as a continuous, minute analog signal representative of the magnetic data on disk platter 278. This minute analog signal is transferred from read/write head assembly 276 to read channel module 264 via preamplifier 270. Preamplifier 270 is operable to amplify the minute analog signals accessed from disk platter 278. In turn, read channel circuit 210 decodes and digitizes the received analog signal to recreate the information originally written to disk platter 278. This data is provided as read data 203 to a receiving circuit. As part of decoding the received information, read channel circuit 210 performs timing recovery on the received data stream using a reduced format timing recovery circuit. The reduced format timing recovery circuit may be implemented similar to that described below in relation to FIG. 3 and/or may operate in accordance with the method discussed below in relation to FIG. 4. A write operation is substantially the opposite of the preceding read operation with write data 201 being provided to read channel circuit 210. This data is then encoded and written to disk platter 278.

It should be noted that storage system 200 may be integrated into a larger storage system such as, for example, a RAID (redundant array of inexpensive disks or redundant array of independent disks) based storage system. It should also be noted that various functions or blocks of storage system 200 may be implemented in either software or firmware, while other functions or blocks are implemented in hardware.

Figure 3:
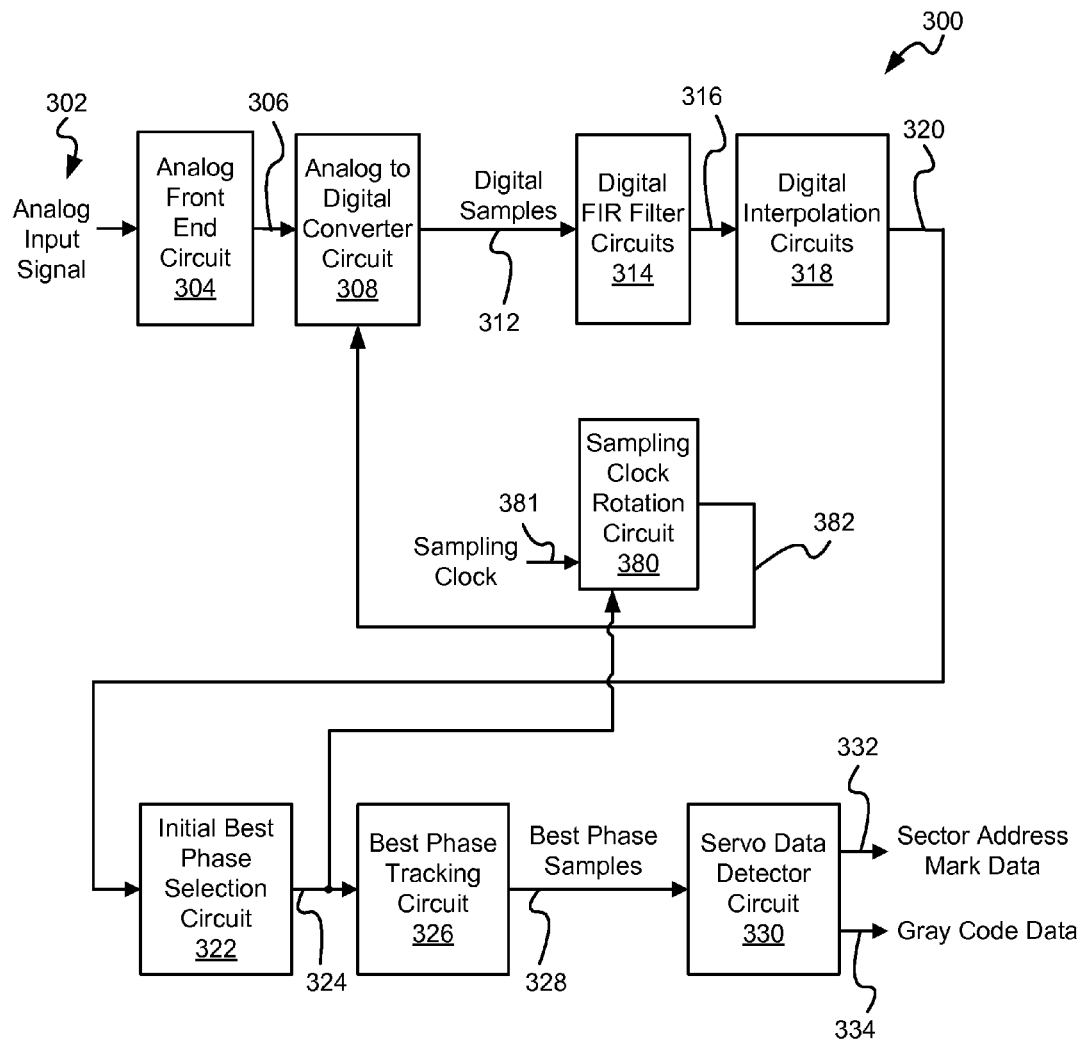
FIG. 3 depicts a reduced format timing recovery circuit in accordance with one or more embodiments of the present invention.

Turning to FIG. 3, a reduced format timing recovery circuit 300 is depicted in accordance with one or more embodiments of the present invention. Timing recovery circuit 300 includes an analog front end circuit 304 that receives an analog input signal 302 and provides a corresponding analog output signal 306. Analog front end circuit 304 may include any circuitry known in the art that is capable of receiving an analog input signal and providing a modified analog signal as an output. In one particular instance, analog front end circuit 304 includes an amplifier (not shown) that receives and amplifies analog input signal 302 and an analog filter (not shown) that reduces any noise exhibited at the output of the amplifier. Based upon the disclosure provided herein, one of ordinary skill in the art will recognize a variety of circuitry that may be included in analog front end circuit 304 in accordance with different embodiments of the present invention.

Analog output signal 306 is provided to an analog to digital converter circuit 308. Analog to digital converter circuit 308 provides a series of digital samples 312 representing analog output signal 306. Digital samples 312 are synchronized to a sample clock 381 that is provided to analog to digital converter circuit 308 via a sampling clock rotation circuit 380. As discussed below, sampling clock 381 may be rotated depending upon the received data. Analog to digital converter circuit 308 may be any circuit or system known in the art that is capable of converting a continuous signal into a series of digital samples. Analog input signal 306 is a continuous signal representing a number of bit periods. The bit periods recur with a periodicity of T, and the sample clock causes analog to digital converter circuit 308 to generate a number of samples of analog input signal 302 for each period T. In one particular embodiment of the present invention, four samples are generated for each period T. In another embodiment of the present invention, eight samples are generated for each period T. It should be noted that other numbers of samples per period may be generated. Based upon the disclosure provided herein, one of ordinary skill in the art will recognize a variety of sampling frequencies and corresponding bit periods that may be used in relation to different embodiments of the present invention. Analog input signal 302 may be derived from a variety of sources. For example, analog input signal 302 may be received from a read/write head assembly (not shown) disposed in relation to a storage medium (not shown). As another example, analog input signal 302 may be derived from a receiver circuit (not shown) that is receiving a wireless transmission. Based upon the disclosure provided herein, one of ordinary skill in the art will recognize a variety of other sources of analog input signal 302.

Digital samples 312 are provided to a bank of digital finite impulse response (FIR) filter circuits 314 that filters the received input and provides corresponding filtered outputs 316. The digital filter circuits 314 may be implemented using any digital filtering architecture or approach known in the art. Filtered outputs 316 are provided to a bank of digital interpolation circuits 318. Digital interpolation circuits 318 create (i.e., interpolate) samples at defined phases during a period T. The period T corresponds to the period of sample clock 381. These interpolated signals are provided as an interpolated output 320.

In one particular embodiment of the present invention, seven digital interpolation circuits 318 are used such that eight phases of the selected filtered outputs 316 are provided as an interpolated output 320. In particular, a first interpolator circuit of digital interpolation circuits 318 creates or interpolates an output corresponding to T/8; a second interpolator circuit of digital interpolation circuits 318 creates or interpolates an output corresponding to T/4; a third interpolator circuit of digital interpolation circuits 318 creates or interpolates an output corresponding to 3T/8; a fourth interpolator circuit of digital interpolation circuits 318 creates or interpolates an output corresponding to T/2; a fifth interpolator circuit of digital interpolation circuits 318 creates or interpolates an output corresponding to 5T/8; a sixth interpolator circuit of digital interpolation circuits 318 creates or interpolates an output corresponding to 3T/4; and a seventh interpolator circuit of digital interpolation circuits 318 creates or interpolates an output corresponding to 7T/8. In one particular embodiment of the present invention, the combination of digital FIR filter circuits 314 and digital interpolation circuits 318 may be implemented using the architecture disclosed in U.S. Pat. No. 7,082,005 entitled "Servo Data Detection in the Presence or Absence of Radial Incoherence Using Digital Interpolators" and issued Jul. 25, 2006. The entirety of the aforementioned reference is incorporated herein by reference for all purposes. Based upon the disclosure provided herein, one of ordinary skill in the art will recognize a variety of interpolation architectures and/or other numbers of interpolator circuits and phase offsets that may be used in relation to different embodiments of the present invention.

Interpolated output 320 is provided to an initial best phase selection circuit 322 that selects an initial best phase (e.g., which phase yields a maximum value). Initial best phase selection circuit 322 selects one of the interpolated values included in interpolated output 320 as the phase that yields the maximum and minimum values as digital samples 312. This may be done using any approach known in the art for identifying a best phase based upon multiple samples across a period. In one particular embodiment of the present invention, initial best phase selection circuit 322 looks at all of the interpolated values across a single period (T) to determine which interpolated value (i.e., the phase corresponding to the interpolated value) produces the maximum value (i.e., peak value). In some cases to average out noise, initial best phase selection circuit 322 repeats the process across multiple periods (T) to determine which phase yields the maximum value. Where the best phase selected for one period is equal to or close to that of a subsequent period, it is determined that a best phase has been identified. In such a case, the best phase of either of the periods may be selected as initial phase output 324. As an example, where the best phase from a subsequent period is displaced by 4T+1/4T from that of a preceding period, it may be identified as close enough and selected for output as initial phase output 324. In some cases in an averaging situation, a best phase from a subsequent period may be considered close enough when it is offset from that in a preceding period by less than +/−(T/4). In other cases in an averaging situation, a best phase from a subsequent period may be considered close enough when it is offset from that in a preceding period by less than +/−(T/8).

A best phase tracking circuit 326 uses the received initial phase output 324 and selects values of interpolated output 320 that correspond to the initial phase output 324. The selected values are provided as best phase samples 328 to a servo data detector circuit 330. Servo data detector circuit 330 parses the received best samples 328 to provide sector address mark data 332 and Gray code data 334. Servo data detector circuit may be any circuit known in the art that is capable of identifying sector address mark data 332 and Gray code data 334 from the received data input stream.

In addition, interpolated output 320 is provided to sampling clock rotation circuit 380. Sampling clock rotation circuit operates to generate a modified sampling clock 382 that is phase offset from sampling clock 381 by a defined sub-period distance. Operation of timing recovery circuit 300 is optimal where modified sampling clock 382 is not offset from the phase of the received data (i.e., the peaks of the received data). In contrast, operation of timing recovery circuit 300 is at its worst where modified sampling clock is offset from the phase of the received data by approximately forty-five degrees. Where a modified sampling clock 382 is sub-optimally offset from the received data, sampling clock rotation circuit 380 rotates (i.e., phase shifts) modified sampling clock 382 away from the sub-optimal phase.

As an example, where digital interpolation circuits 318 includes seven individual interpolation circuits each offset by T/8 as described above and initial phase output 324 is selected as the output from the second interpolation circuit or the third interpolation circuit (i.e., a T/4 phase offset or a 3T/8 phase offset) modified sampling clock 382 is rotated or phase shifted by 0.75T to align it with the received data. Alternatively, where initial phase output 324 is selected as the output from the fourth interpolation circuit (i.e., a T/2 phase offset) modified sampling clock 382 is rotated or phase shifted by 0.5T to align it with the received data, or where initial phase output 324 is selected as the output from the fifth interpolation circuit or the sixth interpolation circuit (i.e., a 5T/8 phase offset or a 3T/4 phase offset) modified sampling clock 382 is rotated or phase shifted by 0.25T to align it with the received data. In some cases, outputs from the other interpolator circuits (i.e., the first interpolator circuit or the seventh interpolator circuit) may be rotated or phase shifted to bring them into closer alignment with the received data, but such may not be needed as the worst phases are expected between T/4 and 3T/4. Other phase offsets (i.e., 0, T/8 and 7T/8) between the received data and modified sampling clock 382 provide a reasonable level of functionality and reliability of timing recovery circuit 300, and thus may not be rotated or phase shifted.

Sampling clock rotation circuit 380 may be any circuit known in the art that is capable of receiving a sampling clock 381 and selectably phase shifting it to yield modified sampling clock 382. In one particular embodiment of the present invention, sampling clock rotation circuit 380 is a coarse phase mixer circuit as are known in the art. In some cases, such a coarse phase mixer is capable of phase shifts greater than T/4. In other cases, such a coarse phase mixer is capable of phase shifts greater than T/8. In yet other cases, such a coarse phase mixer is capable of phase shifts of T/2.

It should be noted that the above shifts are tailored for a sampling clock rotation circuit 380 that is only capable of phase shifting a clock by amounts greater than or equal to T/4. In other cases where sampling clock rotation circuit 380 is capable of phase shifting a clock by amounts greater than or equal to T/8, a phase shift of 5T/8 can be performed where the third interpolation circuit is selected and a phase shift of 3T/8 can be performed where the fifth interpolation circuit is selected. As yet another alternative sampling clock rotation circuit 380 that is only capable of phase shifting a clock by amounts greater than or equal to T/2, a phase shift of T/2 can be performed where any of the third interpolation circuit, the fourth interpolation circuit, or the fifth interpolation circuit is selected.

In operation, analog input signal 302 is received that includes periodic timing recovery data. The received analog input signal is amplified and filtered by analog front end circuit 304, and the resulting output is converted to digital samples 312 by analog to digital converter circuit 308. Digital samples 312 are sampled at a frequency and phase governed by modified sampling clock 382. The frequency of modified sampling clock 382 corresponds to the frequency of sampling clock 381, and the phase of modified sampling clock 382 is initially that of sampling clock 381.

Digital samples 312 are filtered and interpolated to yield an interpolated output 320. Interpolated output 320 includes a number of interpolated values each corresponding to a different sub-phase during the period (T) of modified sampling clock 382. Interpolated output 320 is provided to an initial best phase selection circuit 322 that selects one of the phases represented by interpolated output that yields the maximum or peak value of digital samples 312. This selected phase is identified as an initial phase output 324. Where the initial phase is a problematic phase (e.g., between T/4 and 3T/4), sampling clock rotation circuit 380 phase shifts modified sampling clock 382 relative to sampling clock 381 to avoid the problematic phase. The process of selecting the best phase is repeated using the updated sampling clock 382.

Initial phase output 324 is provided to best phase tracking circuit 326 where it is used to select values of interpolated output 320 that correspond to the initial phase output 324. The selected values are provided as best phase samples 328 to a servo data detector circuit 330. Servo data detector circuit 330 parses the received best samples 328 to provide sector address mark data 332 and Gray code data 334.

Figure 4:
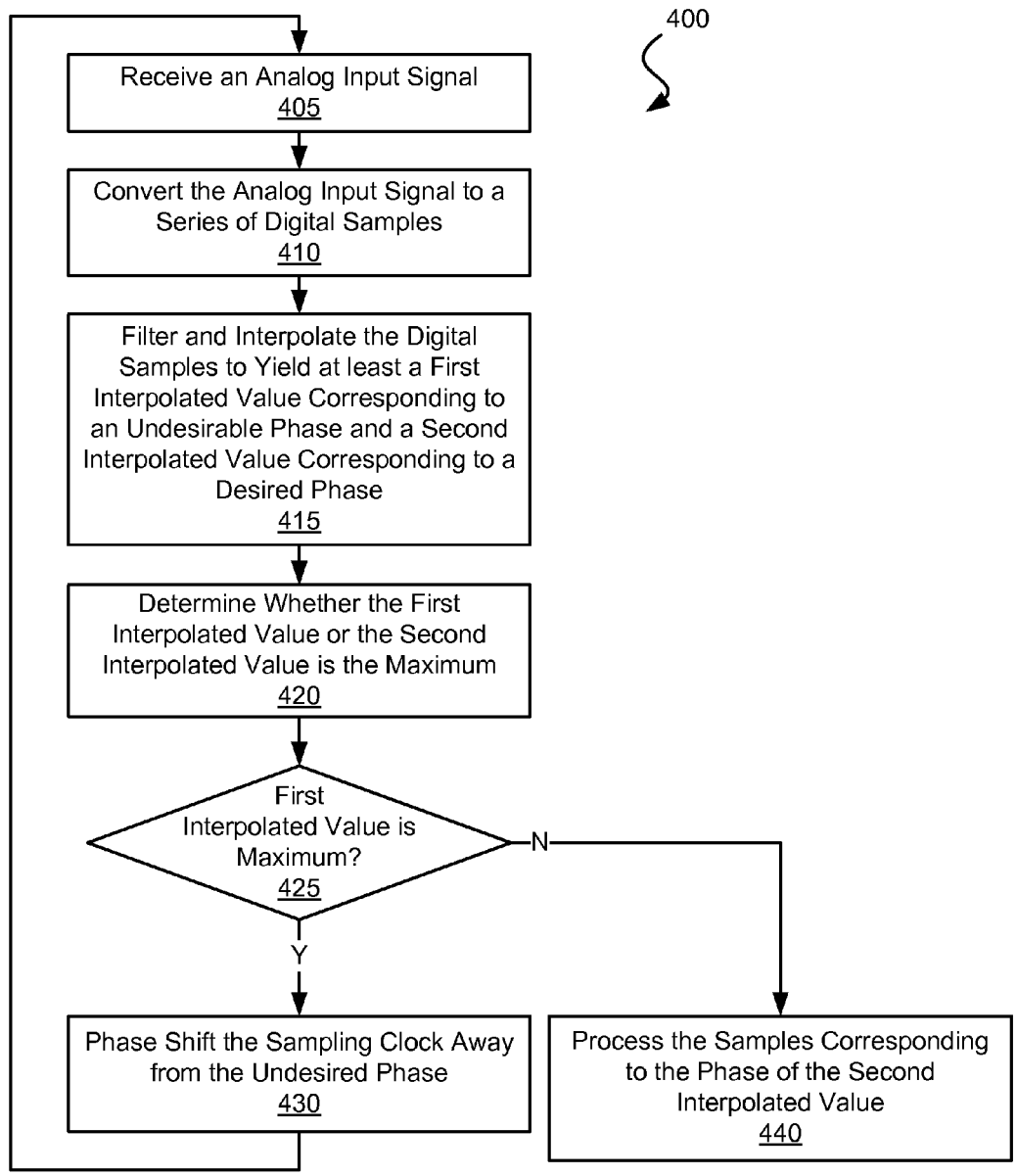
FIG. 4 is a flow diagram depicting a method in accordance with some embodiments of the present invention for reduced format timing recovery.

Turning to FIG. 4, a flow diagram 400 depicts a method in accordance with some embodiments of the present invention for reduced format timing recovery. Following flow diagram 400, an analog input is received (block 405). The analog input may be derived from a variety of sources including, but not limited to, a storage medium or a receiver. Based upon the disclosure provided herein, one of ordinary skill in the art will recognize a variety of sources of the analog input. An analog to digital conversion is performed to convert the analog input into a series of digital samples (block 410). The analog to digital conversion may be done using any analog to digital conversion approach known in the art. The digital samples are filtered and interpolated to yield at least a first and second interpolated value (block 415). The first interpolated value corresponds to an undesirable phase (e.g., a forty five degree phase shift from a zero phase point), and the second interpolated value corresponds to desirable phase (e.g., a phase other than a multiple of forty-five degrees). As used herein, the phrase "undesirable phase" or "undesired phase" is used in its broadest sense to mean any phase where the peak value of a received analog signal is below a desired level. As used herein, the phrase "desirable phase" or "desired phase" is used in its broadest sense to mean a phase where the peak value of a received analog signal is higher than that exhibited by an undesirable phase.

It should be noted that many interpolated values may be calculated. For example, in one embodiment of the present invention, seven interpolated values corresponding respectively to the T/8, T/4, 3T/8, T/2, 5T/8, 3T/4 and 7T/8. In such a case, the T/4, 3T/8, T/2, 5T/8 and 3T/4 are undesirable phases, and the 0, T/8 and 7T/8 are desired phases. Based upon the disclosure provided herein, one of ordinary skill in the art will recognize other numbers of interpolated values and corresponding phases that may be used in relation to one or more embodiments of the present invention. Further, based upon the disclosure provided herein, one of ordinary skill in the art will recognize a variety of desired phases and undesired phases that may be selected.

It is determined whether the first interpolated value or the second interpolated value is a maximum of interpolated values (block 420). The interpolated value that is the maximum is selected as the best phase. It is then determined whether the first interpolated value (i.e., the value associated with an undesirable phase) is a maximum value (block 425). Where the first interpolated value is not the maximum (i.e., the best phase is not the phase of the first interpolated value) (block 425), the received samples corresponding to the phase of the second interpolated value (i.e., a desired phase) are used to perform data processing (block 440). Such processing may include, for example, sector address mark detection and/or Gray code detection.

Based upon the disclosure provided herein, one of ordinary skill in the art may recognize a variety of other types of data processing that may be performed on the received data.

Alternatively, where the first interpolated value is the maximum (i.e., the best phase is the phase of the second interpolated value) (block 430), the sampling clock used to perform the aforementioned analog to digital conversion (block 410) is rotated or phase shifted away from the undesired phase (block 430) and the processes of blocks 405-425 are repeated using data generated by the rotated clock.

Figure 5A:
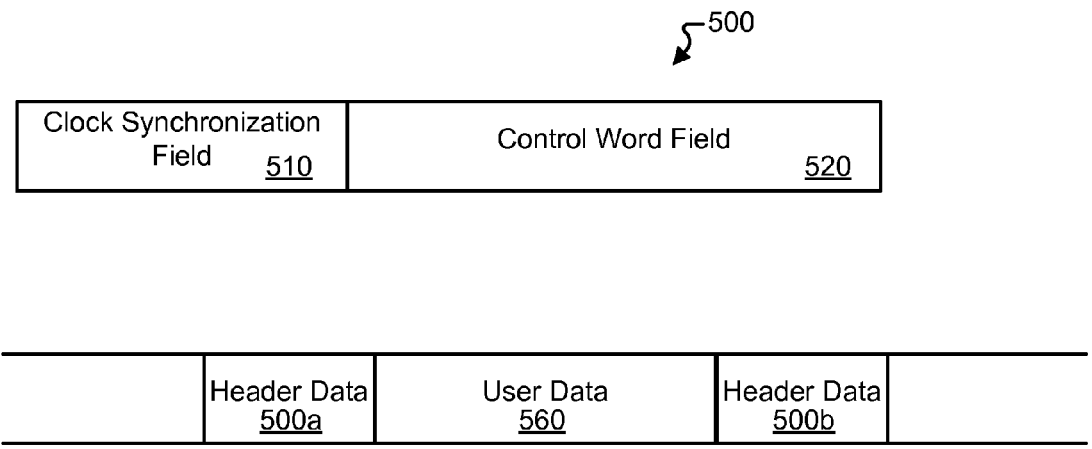
FIG. 5a depicts a wireless transmission data stream including a synchronization field that may be used in relation to one or more embodiments of the present invention.

Turning to FIG. 5*a*, a data set used for a wireless data transfer is depicted. The data set includes a header data field 500 followed by a user data field 560. These pairs of header data and user data are repeated. Header data 500 includes various information used to process user data 560. For example, header data 500 may include a clock synchronization field 510 and a control word field 520. Clock synchronization field 510 includes a periodic pattern that can be used for clock recovery, and control word field 520 contains other information relevant to processing user data 560. It should be noted that the data set is merely an example, and other types of data sets may be used in relation to different embodiments of the present invention. Based upon the disclosure provided herein, one of ordinary skill in the art will recognize other data sets that may be processed in accordance with different embodiments of the present invention.

Figure 5B:
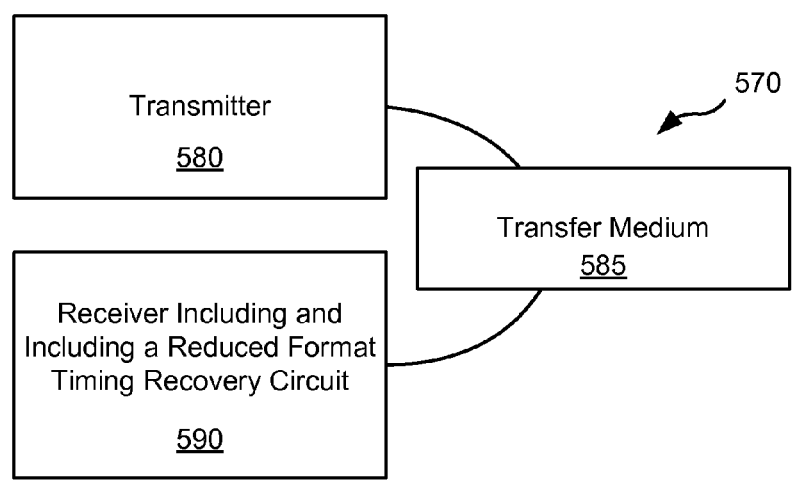
FIG. 5b depicts a communication system including a noise whitened based pattern detector circuit in accordance with different embodiments of the present invention.

Turning to FIG. 5*b*, a communication system 570 including a receiver 590 with a noise whitened based pattern detector circuit is shown in accordance with different embodiments of the present invention. Communication system 570 includes a transmitter 580 that is operable to transmit encoded information via a transfer medium 585 as is known in the art. The encoded data is received from transfer medium 585 by receiver 590. Receiver 590 incorporates a reduced format timing recovery circuit. The reduced format timing recovery circuit may be similar to that discussed above in relation to one or more of relation to FIG. 3 above, and/or may operate in accordance with the method discussed above in relation to FIG. 4.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for performing data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:
1. A timing recovery circuit, the circuit comprising:
a first digital interpolation circuit operable to receive a data input and to provide a first interpolated output corresponding to a first phase;
a second digital interpolation circuit operable to receive the data input and to provide a second interpolated output corresponding to a second phase;

a phase selection circuit operable to select the first interpolated output and the second interpolated output, and to select the first phase for processing; and a sampling clock rotation circuit operable to move a sampling clock away from the first phase.

2. The timing recovery circuit of claim 1, wherein the phase selection circuit is operable to select between the first phase and the second phase based upon a comparison of the first interpolated value and the second interpolated value.

3. The timing recovery circuit of claim 2, wherein the first phase is selected when the first interpolated value is greater than the second interpolated value.

4. The timing recovery circuit of claim 1, wherein the first phase is an undesirable phase.

5. The timing recovery circuit of claim 1, wherein the second phase is a desired phase.

6. The timing recovery circuit of claim 1, wherein the circuit further comprises:

an analog to digital converter circuit operable to convert an analog signal to the data input at a phase governed by the sampling clock.

7. The timing recovery circuit of claim 1, wherein the timing recovery circuit is implemented as part of an integrated circuit.

8. The timing recovery circuit of claim 1, wherein the timing recovery circuit is implemented as part of a storage device.

9. The timing recovery circuit of claim 8, wherein the storage device is a hard disk drive.

10. The timing recovery circuit of claim 1, wherein the timing recovery circuit is implemented as part of a data transmission device.

11. The timing recovery circuit of claim 1, wherein a period of the sampling clock is T, wherein the first phase is between T/4 and 3T/4, and wherein the second phase is selected from a group consisting of: 0, T/8 and 7T/8.

12. The timing recovery circuit of claim 1, wherein the sampling clock rotation circuit is a coarse phase mixer circuit.

13. The timing recovery circuit of claim 1, wherein moving the sampling clock away from the first phase comprises:

phase shifting the sample clock toward a zero phase offset.

14. A method for timing recovery, the method comprising:

receiving an analog signal;

converting the analog signal to a series of digital samples at a phase corresponding to a sample clock;

interpolating a sample from the series of digital samples to yield a first interpolated value corresponding to a first phase and a second interpolated value corresponding to a second phase;

selecting one of the first phase or the second phase based upon the first interpolated value and the second interpolated value to yield a selected phase; and modifying the sample clock based upon the selected phase.

15. The method of claim 14, wherein the selected phase is the first phase, wherein the first phase is an undesirable phase, and wherein modifying the sample clock based upon the selected phase comprises:

phase shifting the sample clock away from the first phase.

16. The method of claim 15, wherein phase shifting the sample clock away from the first phase comprises:

phase shifting the sample clock toward a zero phase offset.

17. The method of claim 14, wherein the selected phase is the second phase, wherein the second phase is a desired phase, and wherein modifying the sample clock based upon the selected phase comprising:

providing a non-phase shifted clock as the sample clock.

18. The method of claim 14, wherein a period of the sample clock is T, wherein the first phase is between T/4 and 3T/4, and wherein the second phase is selected from a group consisting of: 0, T/8 and 7T/8.

19. A storage device, the storage device comprising:

a storage medium operable to store information;

a read/write head assembly disposed in relation to the storage medium, wherein the read/write head assembly is operable to sense the information and to provide an analog signal corresponding to the information; and a read channel circuit comprising:

an analog to digital converter circuit operable to convert a derivative of the analog signal into a series of digital samples at a phase corresponding to a sampling clock;

a first digital interpolation circuit operable to receive a sample from the series of digital samples and to provide a first interpolated output corresponding to a first phase;

a second digital interpolation circuit operable to receive the sample from the series of digital samples and to provide a second interpolated output corresponding to a second phase;

a phase selection circuit operable to select the first phase for processing based at least in part on a comparison of the first interpolated value and the second interpolated value; and a sampling clock rotation circuit operable to move the sampling clock away from the first phase.

20. The storage device of claim 19, wherein a period of the sampling clock is T, wherein the first phase is between T/4 and 3T/4, and wherein the second phase is selected from a group consisting of: 0, T/8 and 7T/8.

* * * * *